(12) United States Patent
Gorokhov et al.

(10) Patent No.: US 9,467,958 B2
(45) Date of Patent: Oct. 11, 2016

(54) METHOD AND APPARATUS FOR MITIGATING TEMPORARY LOSS OF SYNCHRONIZATION IN A WIRELESS COMMUNICATION SYSTEM

(75) Inventors: Alexei Gorokhov, San Diego, CA (US); Avneesh Agrawal, San Diego, CA (US); Samir Kapoor, Doylestown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1652 days.

(21) Appl. No.: 12/178,157

(22) Filed: Jul. 23, 2008

(65) Prior Publication Data
US 2009/0052430 A1 Feb. 26, 2009

Related U.S. Application Data

(60) Provisional application No. 60/957,515, filed on Aug. 23, 2007.

(51) Int. Cl.
*H04J 3/06* (2006.01)
*H04W 56/00* (2009.01)
*H04B 7/26* (2006.01)
*H04J 11/00* (2006.01)
*H04W 48/10* (2009.01)
(Continued)

(52) U.S. Cl.
CPC ....... *H04W 56/0015* (2013.01); *H04B 7/2693* (2013.01); *H04J 11/0069* (2013.01); *H04W 48/10* (2013.01); *H04W 52/143* (2013.01); *H04W 92/10* (2013.01); *Y02B 60/50* (2013.01)

(58) Field of Classification Search
None
See application file for complete search history.

(56) References Cited

U.S. PATENT DOCUMENTS 5,353,332 A * 10/1994 Raith et al. ............... 455/455
7,502,596 B2 * 3/2009 Takao et al. .............. 455/78
(Continued)

FOREIGN PATENT DOCUMENTS

JP 2005079869 A 3/2005
WO 0232011 4/2002
(Continued)

OTHER PUBLICATIONS

International Search Report—PCT/US2008/074095, International Search Authority—European Patent Office—Mar. 25, 2009.
(Continued)

*Primary Examiner* — Faruk Hamza
*Assistant Examiner* — Alan Lindenbaum
(74) *Attorney, Agent, or Firm* — Peng Zhu; Howard Seo

(57) ABSTRACT

Techniques for mitigating temporary loss of synchronization in a wireless communication system are described. In an aspect, a cell may periodically broadcast a mode indicator to indicate synchronous operation or asynchronous operation by the cell. The cell may also broadcast its cell identity (ID), which may omit the mode indicator and would then remain unchanged when the cell switches between asynchronous and synchronous operation. In another aspect, the cell may send system time information indicative of its updated system time when switching from asynchronous operation to synchronous operation. The updated system time may be used for communication with terminals after the switch to synchronous operation. In yet another aspect, the cell may decrease its transmit power prior to switching synchronization mode, switch synchronization mode when its transmit power reaches a predetermined power level, and thereafter increase its transmit power.

29 Claims, 7 Drawing Sheets

(51) Int. Cl.
*H04W 52/14* (2009.01)
*H04W 92/10* (2009.01)

(56) References Cited

U.S. PATENT DOCUMENTS

| | | | |
|---|---|---|---|
| 7,826,820 B2* | 11/2010 | Bjork et al. | 455/403 |
| 2003/0147422 A1* | 8/2003 | You et al. | 370/468 |
| 2005/0175038 A1 | 8/2005 | Carlson et al. | |
| 2006/0292982 A1 | 12/2006 | Ye et al. | |
| 2007/0064730 A1* | 3/2007 | Jin et al. | 370/468 |
| 2007/0177605 A1 | 8/2007 | Benco et al. | |
| 2008/0019314 A1* | 1/2008 | Gorokhov et al. | 370/330 |
| 2008/0080448 A1* | 4/2008 | Rottinghaus | 370/342 |
| 2008/0165969 A1* | 7/2008 | Khandekar et al. | 380/270 |

FOREIGN PATENT DOCUMENTS

| | | |
|---|---|---|
| WO | WO2006004300 A1 | 1/2006 |
| WO | WO2007024245 A1 | 3/2007 |
| WO | 2007083912 | 7/2007 |
| WO | 2007089817 | 8/2007 |
| WO | 2008013404 | 1/2008 |
| WO | 2008058162 | 5/2008 |

OTHER PUBLICATIONS

Motohiro Tanno et al: "Physical Channel Structures and Cell Search Method for Scalable Bandwidth for OFDM Radio Access in Evolved UTRA Downlink" Wireless Communications and Networking Conference, 2007. WCNC 2007. IEEE, Pl, Mar. 1, 2007, pp. 1506-1511.
Written Opinion—PCT/US2008/074095, International Search Authority—European Patent Office—Mar. 25, 2009.
Partial International Search Report—PCT/US2008/074095, International Search Authority—European Patent Office—Dec. 23, 2008.
Taiwan Search Report—TW097132307—TIPO—Oct. 25, 2012.

* cited by examiner

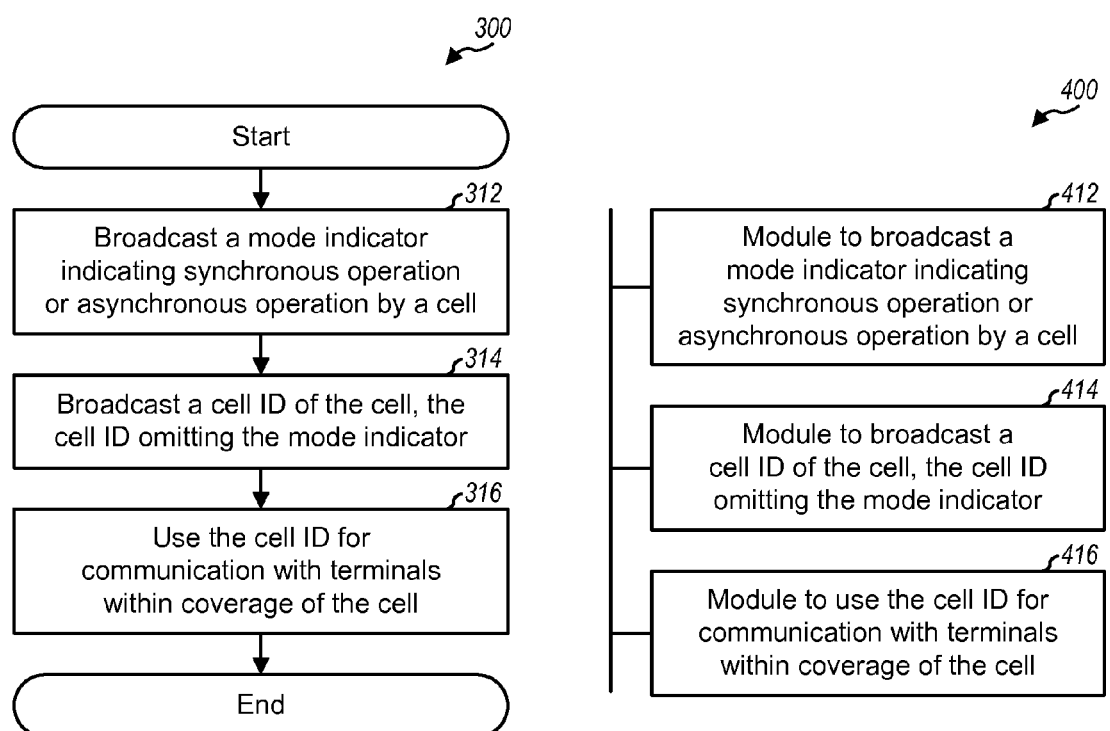

ary U.S.
METHOD AND APPARATUS FOR MITIGATING TEMPORARY LOSS OF SYNCHRONIZATION IN A WIRELESS COMMUNICATION SYSTEM The present application claims priority to provisional U.S. Application Ser. No. 60/957,515, entitled "METHOD AND APPARATUS FOR MITIGATING TEMPORARY LOSS OF GLOBAL SYNCHRONIZATION IN WIRELESS COMMUNICATION SYSTEM," filed Aug. 23, 2007, assigned to the assignee hereof and incorporated herein by reference.

BACKGROUND

I. Field

The present disclosure relates generally to communication, and more specifically to communication techniques for a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of cells that may operate synchronously or asynchronously. For synchronous operation, the timing of each cell may closely track the timing of neighbor cells. Synchronous operation may be achieved by having each cell align its timing to a reference time source, which may be a global navigation satellite system (GNSS). For asynchronous operation, the timing of each cell may not track and may even be pseudo-random with respect to the timing of neighbor cells.

A cell may desire to operate synchronously but may temporarily be unable to align its timing to the reference time source. It may be desirable to effectively handle such temporary loss of synchronization in order to mitigate performance degradation.

SUMMARY

Techniques for mitigating temporary loss of synchronization in a wireless communication system are described herein. In an aspect, a cell may periodically broadcast a mode indicator to convey its current synchronization mode. The mode indicator may be set to a first value to indicate synchronous operation or to a second value to indicate asynchronous operation by the cell. The cell may also broadcast its cell identity (ID), which may be used for communication with terminals. For example, the cell ID may be used to generate a scrambling sequence, a frequency hopping sequence, etc. The cell ID may omit the mode indicator and would then remain unchanged when the cell switches between asynchronous and synchronous operation.

In another aspect, a cell may send system time information indicative of its updated system time when switching from asynchronous operation to synchronous operation. The cell may switch to asynchronous operation upon detecting outage of a GNSS and may thereafter switch back to synchronous operation upon detecting signals from the GNSS. The cell may update its system time for the switch to synchronous operation. The cell may generate system time information indicative of the updated system time and may send the system time information to terminals within detection range of the cell. The updated system time may be used for communication with the terminals after the switch to synchronous operation.

In yet another aspect, a cell may decrease (e.g., slowly ramp down) its transmit power prior to switching its synchronization mode. The cell may switch from a first synchronization mode (e.g., asynchronous operation) to a second synchronization mode (e.g., synchronous operation) when its transmit power reaches a predetermined power level. The cell may thereafter increase (e.g., slowly ramp up) its transmit power after switching to the second synchronization mode.

Various aspects and features of the disclosure are described in further detail below.

BRIEF DESCRIPTION OF THE DRAWINGS

FIG. 3 shows a process for sending a synchronization mode indicator.

FIG. 4 shows an apparatus for sending a synchronization mode indicator.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
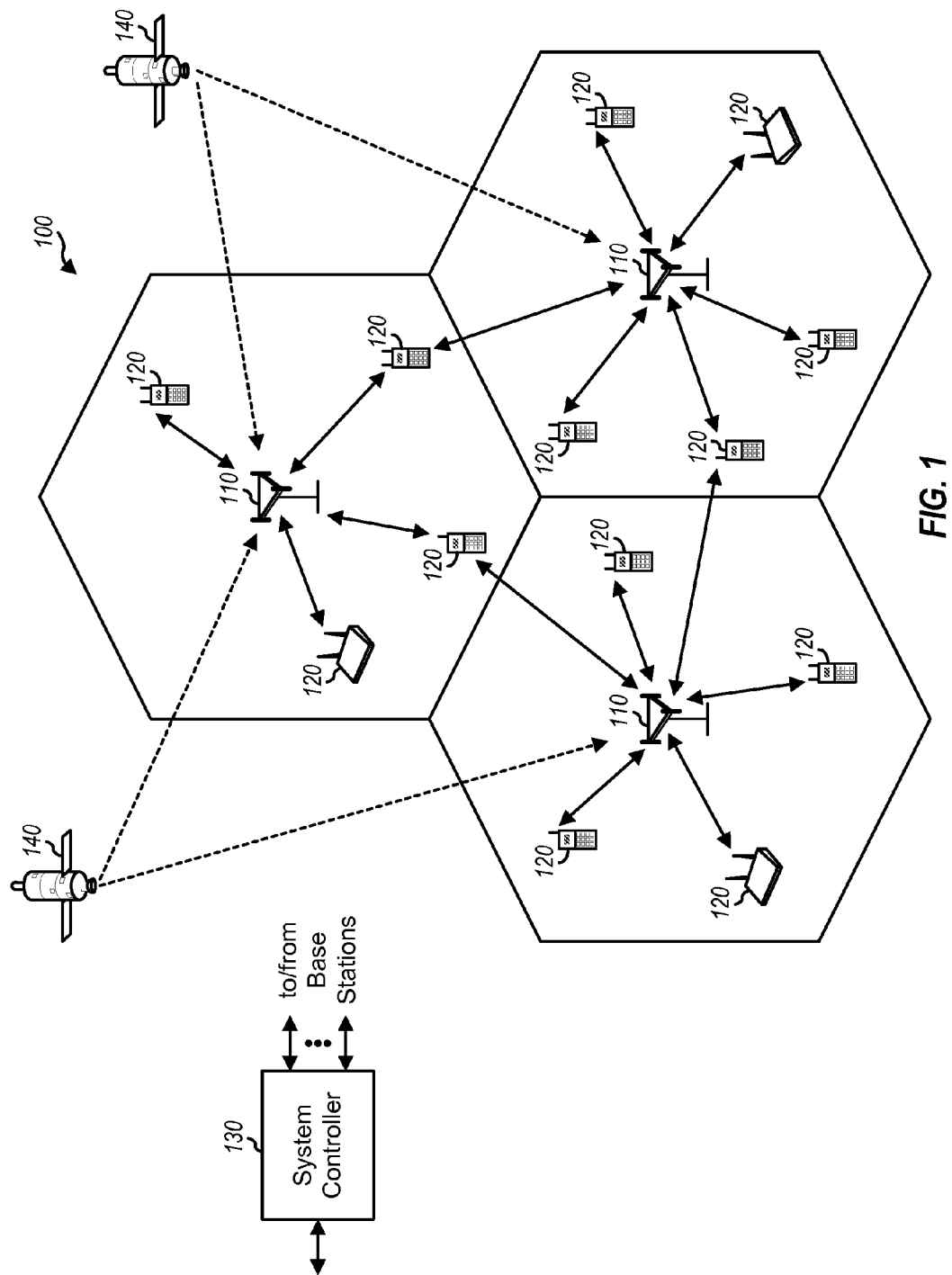
FIG. 1 shows a wireless communication system.

FIG. 1 shows a wireless communication system 100, which may include a number of base stations 110 and other network entities. A base station may be a fixed station that communicates with the terminals and may also be referred to as an access point (AP), a Node B, an evolved Node B (eNB), etc. Each base station 110 provides communication coverage for a particular geographic area. To improve system capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area, depending on the context in which the term is used. In 3GPP2, the term "sector" can refer to the smallest coverage area of a base station and/or a base station subsystem serving this coverage area. For clarity, 3GPP concept of cell is used in the description below, and the term "cell" can refer to a coverage area and/or a base station subsystem serving the coverage area.

Terminals 120 may be dispersed throughout the system, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, etc. A terminal may communicate with a base station via the forward and reverse links. The forward link (or downlink) refers to the communication link from the base station to the terminal, and the reverse link (or uplink) refers to the communication link from the terminal to the base station.

A system controller 130 may couple to a set of base stations and provide coordination and control for these base stations. System controller 130 may be a single network entity or a collection of network entities.

A base station may receive signals from one or more satellites 140, which may be part of the United States Global Positioning System (GPS), the European Galileo system, the Russian GLONASS system, or some other GNSS. The base station may obtain accurate timing information from the satellites and may adjust its timing based on this accurate timing information. All cells in the base station typically have the timing of the base station.

The system may support only synchronous operation, or only asynchronous operation, or either synchronous or asynchronous operation. Synchronous operation may also be referred to as a globally synchronous (GS) mode, and asynchronous operation may also be referred to as a globally asynchronous (GA) mode. The GS mode may assume accurate synchronization of the cells with respect to a reference time source, e.g., GPS or some other GNSS. The GA mode may have very loose or no synchronization requirements.

Figure 2:
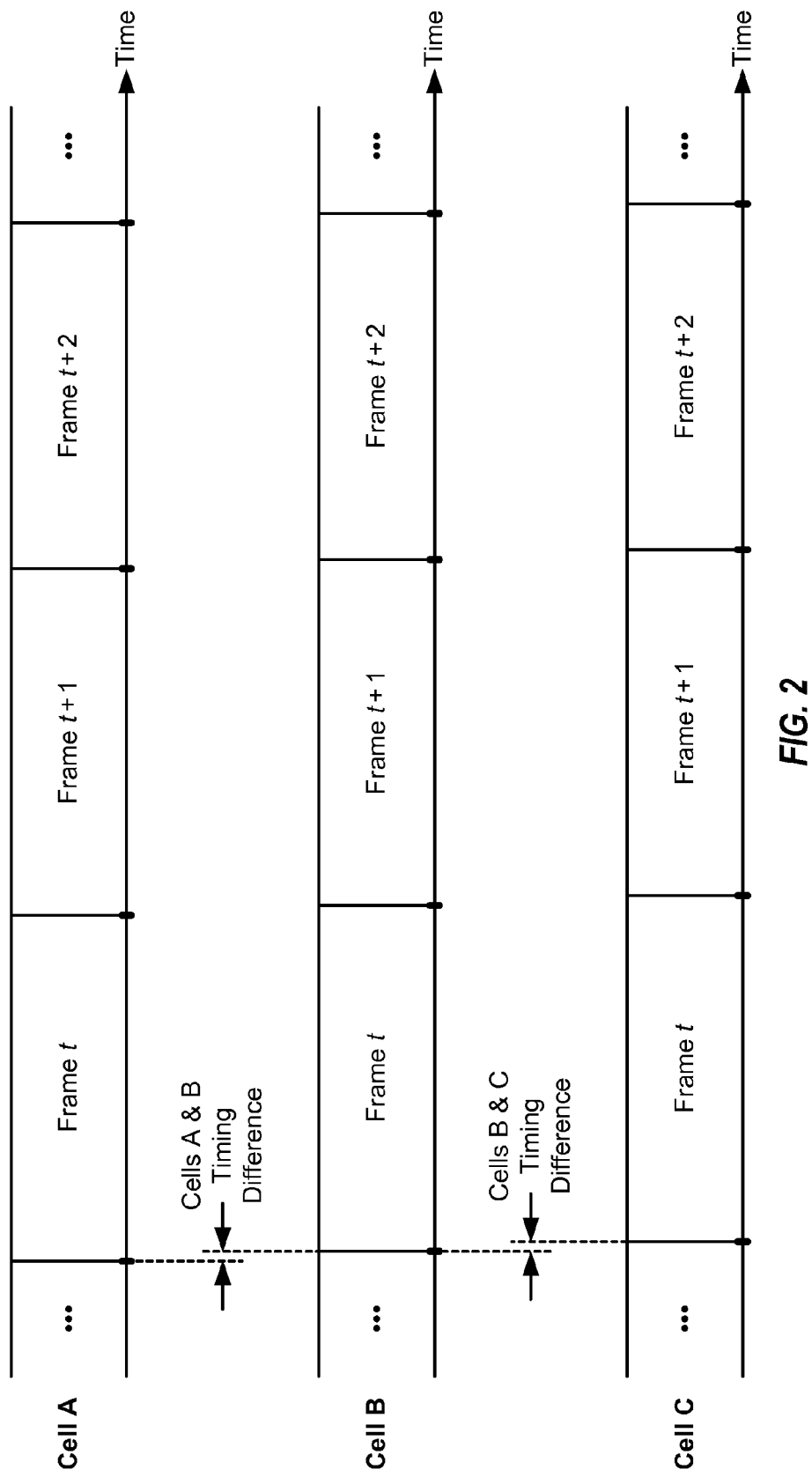
FIG. 2 shows synchronous operation by three cells.

FIG. 2 shows synchronous operation by three cells A, B and C in different base stations. The transmission timeline may be partitioned into units of radio frames. Each radio frame may span a particular time duration, e.g., 10 milliseconds (ms), and may be assigned a frame number. The frame number may be reset to 0 at a specific time, incremented by one for each radio frame thereafter, and wrap around to zero after reaching a maximum value. For synchronous operation, the timing of each cell may closely match the timing of neighbor cells, and the timing difference between adjacent cells may be required to meet certain requirements. For example, the timing of a cell may be typically less than 3 microseconds (μs) and no worse than 10 μs from the timing of the neighbor cells.

Synchronous operation may have certain advantages over asynchronous operation. For example, synchronous operation may improve system capacity due to synchronized interference across cells, synchronized control channels across cells, faster handoff due to cell switching based on re-pointing instead of random access, etc. Synchronous operation may also reduce complexity of cell searches since the timing of undetected cells may be inferred from the timing of detected cells. A terminal may thus perform cell searches over a smaller window around the known timing of a detected cell instead of over all possible timing hypotheses.

However, synchronous operation may be associated with additional cost in order to maintain accurate time synchronization. Stringent synchronization accuracy requirements (e.g., better than 3 μs typically and no worse than 10 μs most of the time) may be achieved with a GNSS receiver as well as a very accurate oscillator at a base station. The GNSS receiver may be used to obtain accurate timing information from satellites, which may be used to update the timing of the cells in the base station. The very accurate oscillator may be used to maintain precise timing for the base station in case of temporary loss of satellite signals due to GNSS outage. For example, the base station may be required to maintain synchronization accuracy (e.g., of 10 μs or better) without any satellite signals for a specified holdover duration (e.g., of eight hours). These stringent holdover requirements may be met with the very accurate oscillator. This oscillator may have a very small frequency error and can then provide accurate timing within the required synchronization accuracy for the entire holdover duration.

It may be desirable for the system to support asynchronous operation as well as synchronous operation. The ability to fall back to asynchronous operation may relax the requirements on oscillator accuracy, which may be important in reducing the cost of base stations. A base station may use a low-cost commercial grade oscillator with a frequency error on the order of 0.5 to 1 parts per million (ppm). In the event of GNSS outage, the base station may have a substantial clock drift, which may result in timing errors well in excess of the synchronization accuracy requirements. The base station may then transition to asynchronous operation during the temporary GNSS outage.

In an aspect, a cell may periodically broadcast a mode indicator to convey its current synchronization mode. The mode indicator may be set to a first value (e.g., 0) to indicate synchronous operation or to a second value (e.g., 1) to indicate asynchronous operation. The cell may set the mode indicator to indicate synchronous operation in the normal case when it can receive satellite signals and obtain accurate timing information. The cell may set the mode indicator to indicate asynchronous operation during temporary GNSS outage and/or for other reasons. The cell may periodically broadcast the mode indicator in a broadcast channel, an acquisition pilot, etc.

A terminal may receive the mode indicator of its serving cell as well as the mode indicators of candidate cells that can potentially serve the terminal. The terminal may control its operation depending on whether the cells are in synchronous or asynchronous operation. For example, the terminal may perform handoff to a target cell using fast re-pointing if this cell operates synchronously or using random access if this cell operates asynchronously. The terminal may also perform cell search and acquisition in different manners for synchronous and asynchronous cells. Furthermore, the structure of physical channels (e.g., overhead channels within a superframe preamble) may depend on a cell's synchronization mode. Hence, it may be desirable for a terminal to detect the mode indicator of a cell as soon as the acquisition pilot of the cell is detectable by the terminal. This may be achieved by periodically broadcasting the mode indicator.

A cell may be assigned a cell ID and may periodically broadcast its cell ID to allow terminals to identify the cell. The cell ID may also be referred to as a sector ID, etc. In one design, the cell ID omits the mode indicator of the cell. This design may allow the cell to have the same cell ID regardless of whether the cell is operating synchronously or asynchronously.

Inclusion of the mode indicator in the cell ID may cause certain operational problems. Each cell may be assumed to be statically configured to operate synchronously or asynchronously. The cell ID may be composed of an assigned part and the mode indicator. For example, in UMB, a PilotID is composed of a 9-bit PilotPN and a 1-bit GS/GA indicator and is used for a cell ID. The same assigned part (e.g., the PilotPN) may be used for different possibly adjacent cells as long as they have different mode indicators and therefore different cell IDs. This may imply that switching a cell from synchronous operation to asynchronous operation, or vise versa, may be regarded by the terminals as disappearance of one cell and appearance of another cell. A sudden switch in the synchronization mode of the cell may be disruptive especially for terminals located close to the cell since these terminals may lose their serving cell without an option of fast handoff. Furthermore, the cell ID may be used to generate scrambling sequences for various physical channels, to generate frequency hopping sequences, etc. A sudden synchronization mode switch may cause disruption due to changes in the scrambling sequences, the frequency hopping sequences, etc.

The mode indicator may be omitted from the cell ID in order to avoid the operational problems described above. In this case, the cell ID would not change when the synchronization mode of a cell is switched. For UMB, the PilotPN instead of the PilotID may be used for over-the-air identification of a cell and for addressing the cell, e.g., for purpose of active set management. Correspondingly, a terminal may consider a change in the GS/GA bit as a change in the synchronization mode of a cell rather than disappearance of one cell and appearance of another cell. Additionally, if a cell is identified by its PilotPN rather than its PilotID, then various scramblers may be seeded by the PilotPN instead of the PilotID. The use of the PilotPN may prevent potential disruption in control and/or traffic signaling upon a synchronization mode switch.

FIG. 3 shows a design of a process 300 for sending synchronization mode indication. Process 300 may be performed by a base station for a cell or by some other entity. A mode indicator indicating synchronous operation or asynchronous operation by a cell may be broadcast (block 312). A cell ID of the cell may also be broadcast, with the cell ID omitting the mode indicator (block 314). The cell ID may be used for communication with terminals within the coverage of the cell (block 316). In one design of block 316, a scrambling sequence may be generated based on the cell ID and may be used to scramble data to send to a terminal. In another design of block 316, a frequency hopping sequence may be generated based on the cell ID and may be used to determine resources (e.g., subcarriers) to use for communication with a terminal.

FIG. 4 shows a design of an apparatus 400 for sending synchronization mode indication. Apparatus 400 includes a module 412 to broadcast a mode indicator indicating synchronous operation or asynchronous operation by a cell, a module 414 to broadcast a cell ID of the cell, with the cell ID omitting the mode indicator, and a module 416 to use the cell ID for communication with terminals within the coverage of the cell.

A cell may maintain system time based on its clock, which may specify time with certain accuracy and may or may not be locked to a GNSS. System time accuracy may be limited to the minimum periodicity of synchronization signals sent by the cell, which may be one radio frame of 10 ms in LTE or one superframe of approximately 23 ms in UMB. The maximum span of system time may be relatively long (e.g., many years) and may be used by various protocols and layers. These layers (e.g., physical channels) may carry certain number of least significant bits (LSBs) of system time in order to recover time instead of the entire system time.

In another aspect, a cell may send system time information indicative of its updated system time when switching from asynchronous operation to synchronous operation. The cell may switch to synchronous operation when it can receive satellite signals and update its timing with the accurate timing of the satellites. The system time information sent by the cell may comprise an accurate system time update relative to the current system time for the cell, e.g., with accuracy defined by the minimum periodicity of synchronization signals. The system time information may also comprise other types of information.

The cell may broadcast the system time information to all terminals within its coverage. Alternatively or additionally, the cell may send the system time information via unicast messages to terminals in connected mode and actively communicating with the cell. The cell may also send the system time information to terminals having the cell in their active sets, e.g., by tunneling the system time information to the serving cells of these terminals. In any case, the cell may send the system time information to terminals within detection range of the cell. The terminals within detection range of the cell are terminals that can receive a signal from the cell and may include terminals served by the cell, terminals within the coverage of the cell, terminals in the neighborhood of the cell, etc.

The cell may decide to switch to synchronous operation at a designated switch time. The cell may use its current system time to generate scrambling sequences, frequency hopping sequences, etc., prior to the switch time. The cell may use its updated system time to generate the scrambling sequences, frequency hopping sequences, etc., after the switch time. The cell may communicate the system time information ahead of the switch time. This may ensure that the terminals will have the updated system time and can demodulate control and/or traffic channels from the moment when the switch to synchronous operation occurs. A message carrying the system time information may also indicate the switch time (e.g., a frame number or a superframe index) when the synchronization mode switch will occur.

Figure 5:
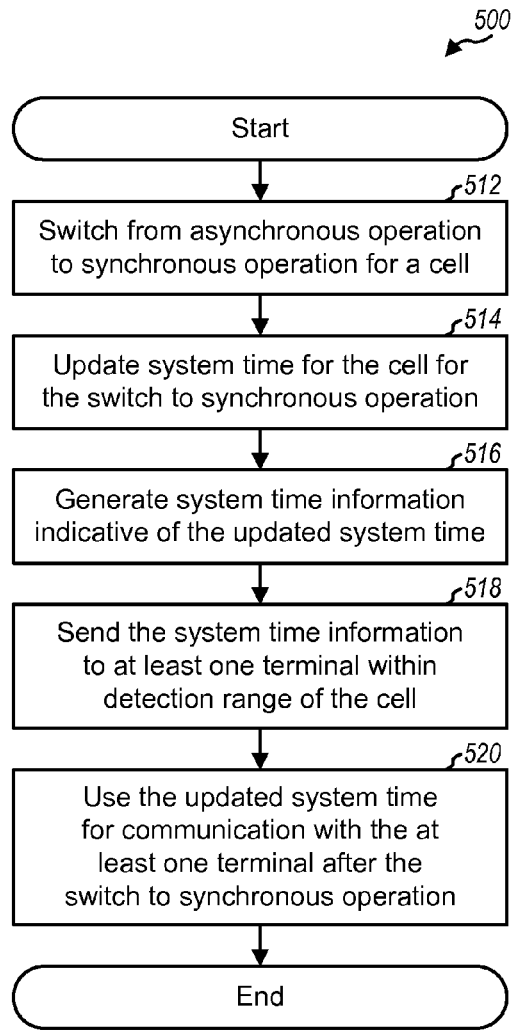
FIG. 5 shows a process for sending system time information for a synchronization mode switch.

FIG. 5 shows a design of a process 500 for sending system time information for a synchronization mode switch. Process 500 may be performed by a base station for a cell or by some other entity. A cell may switch from asynchronous operation to synchronous operation (block 512). For block 512, the cell may switch to asynchronous operation upon detecting outage of a GNSS (e.g., GPS) and may thereafter switch back to synchronous operation upon detecting signals from the GNSS. System time for the cell may be updated for the switch to synchronous operation (block 514). System time information indicative of the updated system time may be generated (block 516). The system time information may comprise a system time update relative to current system time for the cell and/or some other information.

The system time information may be sent to at least one terminal within detection range of the cell, e.g., terminals within coverage of the cell or in the neighborhood of the cell (block 518). For block 518, the system time information may be sent prior to a designated switch time for switching from asynchronous operation to synchronous operation. The designated switch time may also be sent to the at least one terminal, e.g., along with the system time information. The system time information may be (i) broadcast to all terminals within detection range of the cell (ii) sent in unicast messages to terminals communicating with the cell, (iii) sent to terminals with active sets including the cell, and/or (iv) sent in other manners. The updated system time may be used for communication with the at least one terminal after the switch to synchronous operation (block 520). For example, the updated system time may be used to generate a scrambling sequence, a frequency hopping sequence, etc.

Figure 6:
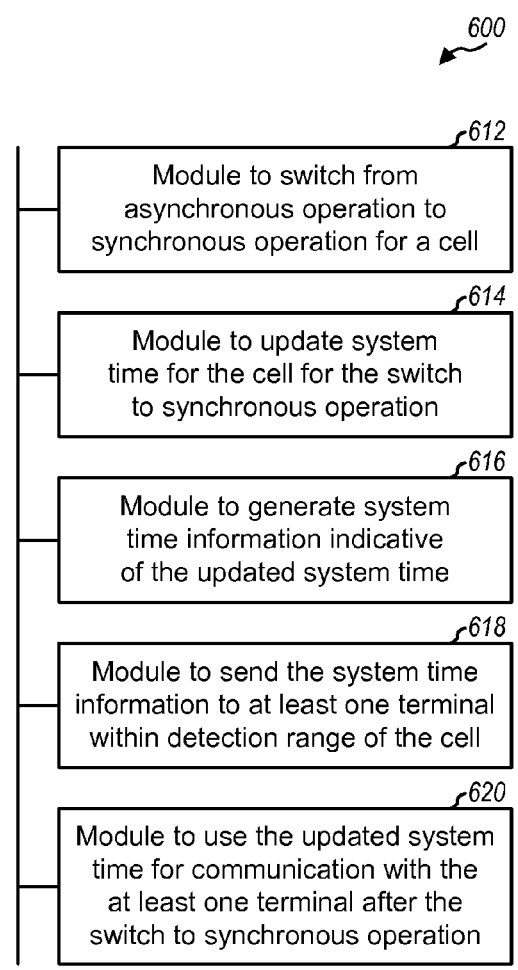
FIG. 6 shows an apparatus for sending system time information.

FIG. 6 shows a design of an apparatus 600 for sending system time information for a synchronization mode switch. Apparatus 600 includes a module 612 to switch from asynchronous operation to synchronous operation for a cell, a module 614 to update system time for the cell for the switch to synchronous operation, a module 616 to generate system time information indicative of the updated system time, a module 618 to send the system time information to at least one terminal within detection range of the cell, and a module 620 to use the updated system time for communication with the at least one terminal after the switch to synchronous operation.

In yet another aspect, a cell may decrease (e.g., slowly ramp down) its transmit power prior to a switch in synchronization mode and may increase (e.g., slowly ramp up) its transmit power after the switch. The cell may decrease the transmit power of its preamble or some other transmission used by the terminals to detect the cell. The cell may switch its synchronization mode when its transmit power reaches a predetermined power level (e.g., a low level or zero). The cell may thereafter increase its transmit power back to the nominal level.

Slowly ramping down and ramping up the transmit power of a cell during a synchronization mode switch may mitigate adverse effects due to the switch. For example, the slow ramp down and slow ramp up may be beneficial in a system in which a change in the mode indicator of a cell may be interpreted by the terminals as disappearance of the cell and appearance of another cell. The slow ramp down prior to the synchronization mode switch may allow the terminals to discover neighbor cells, to add these cells to their active sets, and to perform handoff from the cell before the switch occurs. Likewise, the slow ramp up after the synchronization mode switch may allow the terminals to detect the ramping cell, to add the cell to their active sets, and to perform handoff to this cell when the power level becomes sufficiently strong. If the cell did not slowly ramp down and did not slowly ramp up, then the terminals within the coverage of the cell may not be able to complete handoff since the cell may disappear too quickly, and these terminals may drop connection.

A switch in synchronization mode may not be a time-critical operation, and loss of timing synchronization during the switch may be a slow process. With an oscillator having 1 ppm frequency error, the cell timing may drift by approximately 5 μs in every second. Thus, the ramp up rate may be on the order of 1 to 2 seconds.

Figure 7:
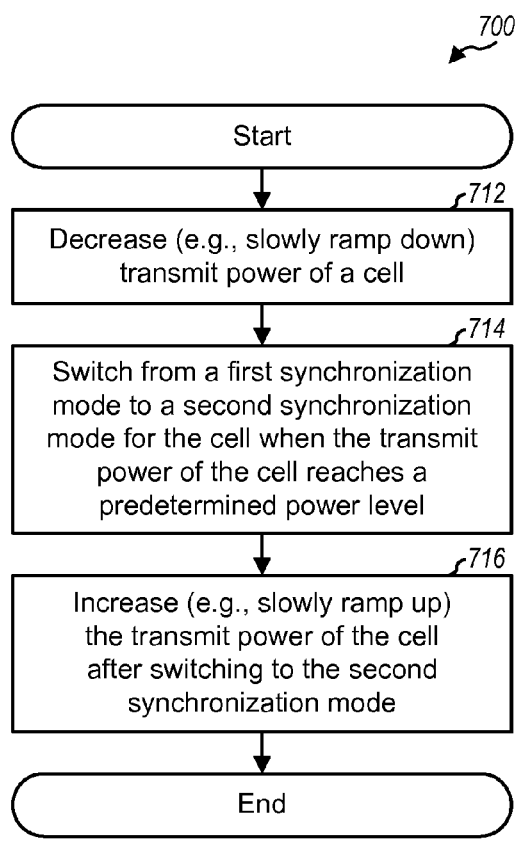
FIG. 7 shows a process for switching the synchronization mode of a cell.

FIG. 7 shows a design of a process 700 for switching synchronization mode. Process 700 may be performed by a base station for a cell or by some other entity. Transmit power of a cell may be decreased (block 712). The cell may switch from a first synchronization mode to a second synchronization mode (e.g., from asynchronous operation to synchronous operation) when the transmit power of the cell reaches a predetermined power level (block 714). The transmit power of the cell may be increased after switching to the second synchronization mode (block 716).

In one design, the transmit power of the cell may be decreased by slowly ramping down the transmit power and may be increased by slowly ramping up the transmit power. The transmit power of a designated transmission from the cell may be decreased and thereafter increased. The designated transmission may be a preamble, a synchronization signal, a reference signal, pilot, etc.

Figure 8:
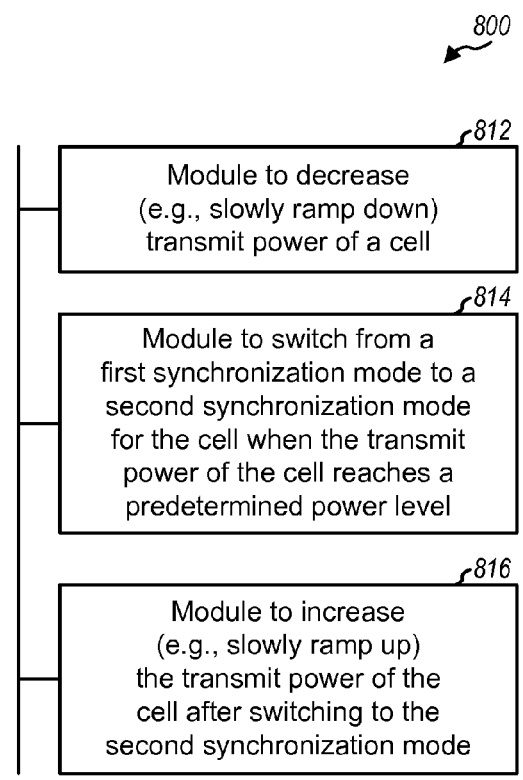
FIG. 8 shows an apparatus for switching the synchronization mode of a cell.

FIG. 8 shows a design of an apparatus 800 for performing a switch in synchronization mode. Apparatus 800 includes a module 812 to decrease transmit power of a cell, a module 814 to switch from a first synchronization mode to a second synchronization mode for the cell when the transmit power of the cell reaches a predetermined power level, and a module 816 to increase the transmit power of the cell after switching to the second synchronization mode.

Figure 9:
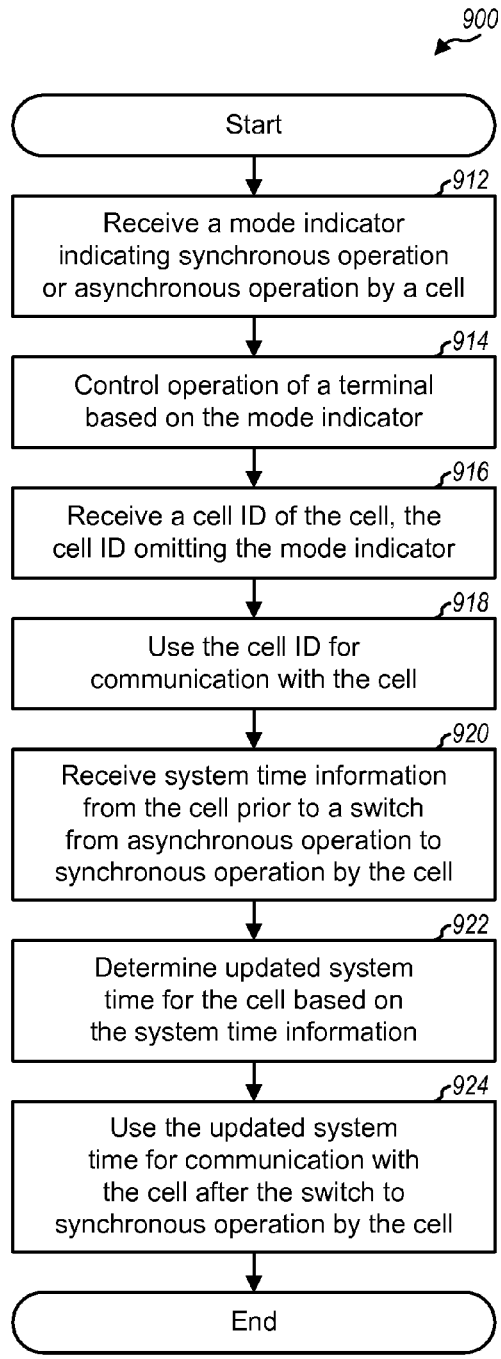
FIG. 9 shows a process performed by a terminal.

FIG. 9 shows a design of a process 900 performed by a terminal. The terminal may receive a mode indicator indicating synchronous operation or asynchronous operation by a cell (block 912). The terminal may control its operation based on the mode indicator (block 914). In one design, the terminal may perform handoff to the cell based on a first handoff scheme (e.g., using fast re-pointing) if the cell is in synchronous operation. The terminal may perform handoff to the cell based on a second handoff scheme (e.g., using random access) if the cell is in asynchronous operation. In one design, the terminal may perform cell searches (e.g., determine a search window) based on whether the mode indicator indicates synchronous operation or asynchronous operation by the cell.

The terminal may receive a cell ID of the cell, with the cell ID omitting the mode indicator (block 916). The terminal may use the cell ID for communication with the cell (block 918). In one design of block 918, the terminal may generate a scrambling sequence based on the cell ID and may use the scrambling sequence to scramble data to send to the cell. In another design of block 918, the terminal may generate a frequency hopping sequence based on the cell ID and may use this sequence to determine resources (e.g., subcarriers) to use for communication with the cell.

The terminal may receive system time information from the cell prior to a switch from asynchronous operation to synchronous operation by the cell (block 920). The terminal may determine updated system time for the cell based on the system time information (block 922). The terminal may use the updated system time for communication with the cell after the switch to synchronous operation by the cell (block 924). For block 924, the terminal may generate the scrambling sequence and/or the frequency hopping sequence based on the updated system time. The terminal may detect decreasing transmit power for the cell prior to the switch and may detect increasing transmit power for the cell after the switch.

Figure 10:
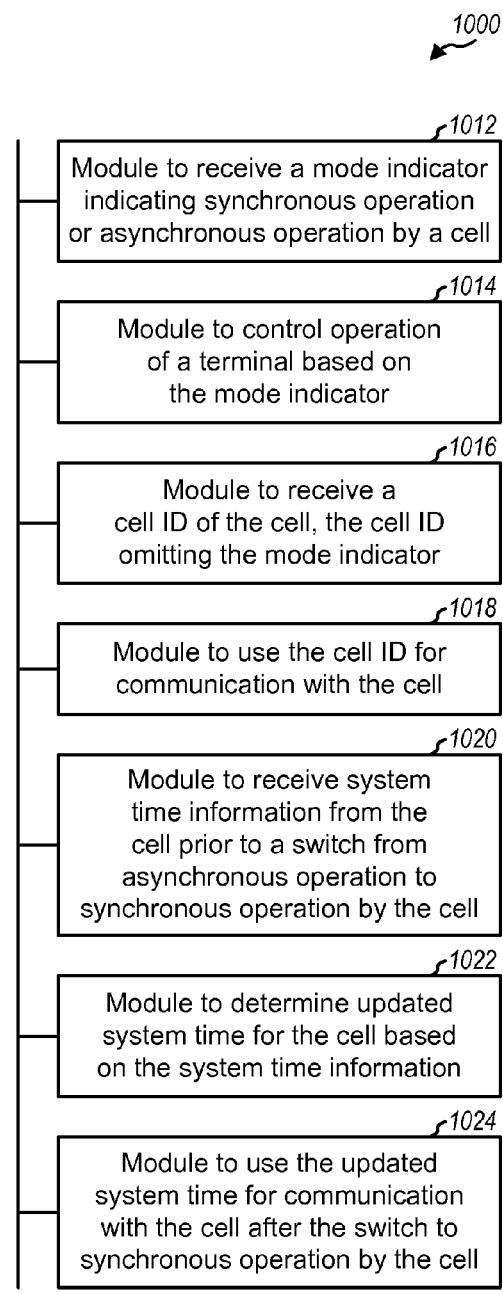
FIG. 10 shows an apparatus for a terminal.

FIG. 10 shows a design of an apparatus 1000 for a terminal. Apparatus 1000 includes a module 1012 to receive a mode indicator indicating synchronous operation or asynchronous operation by a cell, a module 1014 to control operation of the terminal based on the mode indicator, a module 1016 to receive a cell ID of the cell, with the cell ID omitting the mode indicator, a module 1018 to use the cell ID for communication with the cell, a module 1020 to receive system time information from the cell prior to a switch from asynchronous operation to synchronous operation by the cell, a module 1022 to determine updated system time for the cell based on the system time information, and a module 1024 to use the updated system time for communication with the cell after the switch to synchronous operation by the cell.

The modules in FIGS. 4, 6, 8 and 10 may comprise processors, electronics devices, hardware devices, electronics components, logical circuits, memories, etc., or any combination thereof.

Figure 11:
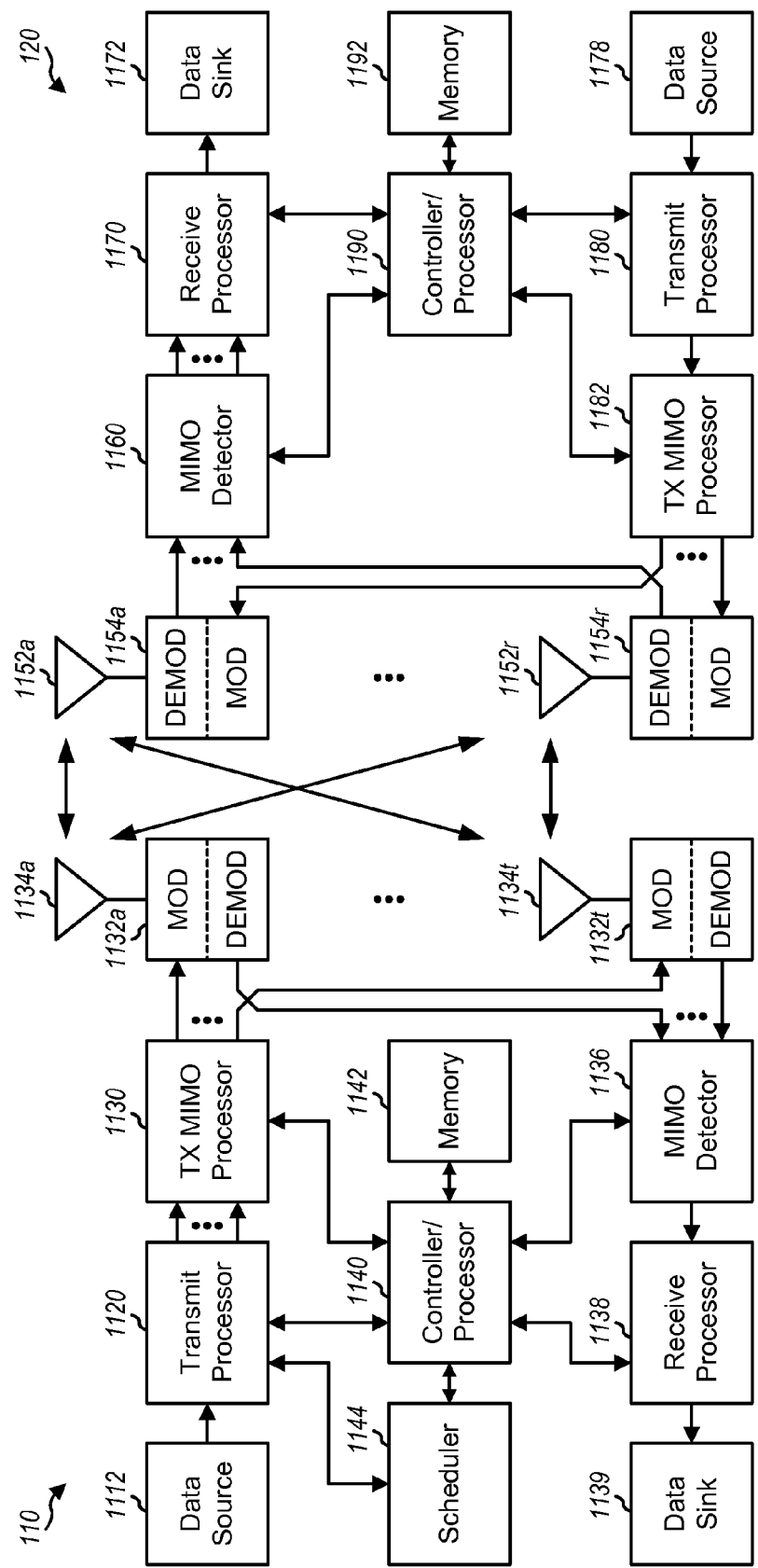
FIG. 11 shows a block diagram of a base station and a terminal.

FIG. 11 shows a block diagram of a design of base station 110 and terminal 120, which may be one of the base stations and one of the terminals in FIG. 1. In this design, base station 110 is equipped with T antennas 1134*a* through 1134*t*, and terminal 120 is equipped with R antennas 1152*a* through 1152*r*, where in general T≥1 and R≥1.

At base station 110, a transmit processor 1120 may receive data for one or more terminals from a data source 1112, process (e.g., encode and modulate) the data for each terminal based on one or more modulation and coding schemes, and provide data symbols for all terminals. Transmit processor 1120 may also receive control information (e.g., a mode indicator, system time information, etc.) from a controller/processor 1140, process the control information, and provide control symbols. A transmit (TX) multiple-input multiple-output (MIMO) processor 1130 may multiplex the data symbols and the control symbols with pilot symbols, process (e.g., precode) the multiplexed symbols, and provide T output symbol streams to T modulators (MOD) 1132*a* through 1132*t*. Each modulator 1132 may process a respective output symbol stream (e.g., for OFDM, CDMA, etc.) to obtain an output sample stream. Each modulator 1132 may further process (e.g., convert to analog, amplify, filter, and upconvert) the output sample stream to obtain a forward link signal. T forward link signals from modulators 1132*a* through 1132*t* may be transmitted via T antennas 1134*a* through 1134*t*, respectively.

At terminal 120, R antennas 1152*a* through 1152*r* may receive the forward link signals from base station 110 and provide received signals to demodulators (DEMOD) 1154*a* through 1154*r*, respectively. Each demodulator 1154 may condition (e.g., filter, amplify, downconvert, and digitize) a respective received signal to obtain received samples and may further process the received samples (e.g., for OFDM, CDMA, etc.) to obtain received symbols. A MIMO detector 1160 may perform MIMO detection on the received symbols from all R demodulators 1154*a* through 1154*r* and provide detected symbols. A receive processor 1170 may process (e.g., demodulate and decode) the detected symbols, provide decoded data for terminal 120 to a data sink 1172, and provide decoded control information to a controller/processor 1190.

On the reverse link, at terminal 120, data from a data source 1178 and control information from controller/processor 1190 may be processed by a transmit processor 1180, precoded by a TX MIMO processor 1182 (if applicable), conditioned by modulators 1154*a* through 1154*r*, and transmitted via antennas 1152*a* through 1152*r*. At base station 110, the reverse link signals from terminal 120 may be received by antennas 1134, conditioned by demodulators 1132, detected by a MIMO detector 1136, and processed by a receive processor 1138 to obtain the data and control information transmitted by terminal 120.

Controllers/processors 1140 and 1190 may direct the operation at base station 110 and terminal 120, respectively. Controller/processor 1140 at base station 110 may implement or direct process 300 in FIG. 3, process 500 in FIG. 5, process 700 in FIG. 7, and/or other processes for the techniques described herein. Controller/processor 1190 at terminal 120 may implement or direct process 900 in FIG. 9 and/or other processes for the techniques described herein. Memories 1142 and 1192 may store data and program codes for base station 110 and terminal 120, respectively. Scheduler 1144 may schedule terminals for transmissions on the forward and reverse links.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
switching from asynchronous operation to synchronous operation for a cell at a designated switch time;
updating system time for the cell for the switch to synchronous operation;
generating system time information indicative of the updated system time and the designated switch time; and
sending the system time information to at least one terminal within detection range of the cell prior to the designated switch time such that the at least one terminal receives the system time information prior to the designated switch time.

2. The method of claim 1, further comprising:
switching to asynchronous operation for the cell upon detecting outage of a global navigation satellite system (GNSS), and wherein the switching from asynchronous operation comprises switching from asynchronous operation to synchronous operation upon detecting signals from the GNSS.

3. The method of claim 1,
wherein the system time information comprises a system time update relative to current system time for the cell, and
wherein the current system time comprises a system time determined when in the asynchronous operation.

4. The method of claim 1, further comprising:
using the updated system time for communication with the at least one terminal after the switch to synchronous operation.

5. The method of claim 1, further comprising:
sending information indicative of the designated switch time to the at least one terminal.

6. The method of claim 1, wherein sending the system time information comprises broadcasting the system time information to all terminals within detection range of the cell.

7. The method of claim 1, wherein sending the system time information comprises sending the system time information in unicast messages to terminals communicating with the cell.

8. The method of claim 1, wherein sending the system time information comprises sending the system time information to terminals with active sets including the cell.

9. An apparatus for wireless communication, comprising:
at least one processor configured to switch from asynchronous operation to synchronous operation for a cell at a designated switch time, update system time for the cell for the switch to synchronous operation, generate system time information indicative of the updated system time and the designated switch time, and send the system time information to at least one terminal within detection range of the cell prior to the designated switch time such that the at least one terminal receives the system time information prior to the designated switch time.

10. The apparatus of claim 9, wherein the at least one processor is configured to switch to asynchronous operation for the cell upon detecting outage of a global navigation satellite system (GNSS), and to switch from asynchronous operation to synchronous operation upon detecting signals from the GNSS.

11. An apparatus for wireless communication, comprising:
means for switching from asynchronous operation to synchronous operation for a cell at a designated switch time;
means for updating system time for the cell for the switch to synchronous operation;
means for generating system time information indicative of the updated system time and the designated switch time; and
means for sending the system time information to at least one terminal within detection range of the cell prior to the designated switch time such that the at least one terminal receives the system time information prior to the designated switch time.

12. The apparatus of claim 11, further comprising:
means for switching to asynchronous operation for the cell upon detecting outage of a global navigation satellite system (GNSS), and
wherein the means for switching from asynchronous operation comprises means for switching from asynchronous operation to synchronous operation upon detecting signals from the GNSS.

13. A computer program product, comprising a non-transitory computer-readable medium storing instructions that, when executed, cause one or more processors to:
switch from asynchronous operation to synchronous operation for a cell at a designated switch time,
update system time for the cell for the switch to synchronous operation and the designated switch time,
generate system time information indicative of the updated system time, and
send the system time information to at least one terminal within detection range of the cell prior to the designated switch time such that the at least one terminal receives the system time information prior to the designated switch time.

14. A method for wireless communication, comprising:
decreasing transmit power of a cell while operating in a first synchronization mode;
switching from the first synchronization mode to a second synchronization mode for the cell when the transmit power of the cell reaches a predetermined power level such that the cell operates in accordance with the second synchronization mode; and
increasing the transmit power of the cell after switching to the second synchronization mode.

15. The method of claim 14,
wherein decreasing the transmit power comprises ramping down the transmit power of the cell, and
wherein increasing the transmit power comprises ramping up the transmit power of the cell.

16. The method of claim 14,
wherein decreasing the transmit power comprises decreasing the transmit power of a designated transmission from by the cell, and
wherein increasing the transmit power comprises increasing the transmit power of the designated transmission.

17. The method of claim 14, wherein the first synchronization mode is for asynchronous operation and the second synchronization mode is for synchronous operation.

18. An apparatus for wireless communication, comprising:
at least one processor configured to decrease transmit power of a cell while operating in a first synchronization mode, to switch from a first synchronization mode to a second synchronization mode for the cell when the transmit power of the cell reaches a predetermined power level such that the cell operates in accordance with the second synchronization mode, and to increase the transmit power of the cell after switching to the second synchronization mode.

19. The apparatus of claim 18, wherein the at least one processor is configured to ramp down the transmit power of the cell prior to switching to the second synchronization mode, and to ramp up the transmit power of the cell after switching to the second synchronization mode.

20. A method for wireless communication, comprising:
receiving a mode indicator indicating synchronous operation or asynchronous operation by a cell;
receiving a cell identity (ID) of the cell, the cell ID omitting the mode indicator for the cell;
using the cell ID for communication with the cell; and
performing cell searches based on whether the mode indicator indicates synchronous operation or asynchronous operation by the cell.

21. The method of claim 20, wherein using the cell ID for communication with the cell comprises
generating a scrambling sequence or a frequency hopping sequence based on the cell ID, and
processing data to send to the cell with the scrambling sequence or the frequency hopping sequence.

22. The method of claim 20, further comprising:
receiving system time information from the cell prior to a switch from asynchronous operation to synchronous operation by the cell;
determining updated system time for the cell based on the system time information; and
using the updated system time for communication with the cell after the switch to synchronous operation by the cell.

23. The method of claim 22, wherein using the updated system time for communication with the cell comprises
generating a scrambling sequence or a frequency hopping sequence based on the updated system time, and
processing data to send to the cell with the scrambling sequence or the frequency hopping sequence.

24. The method of claim 20, further comprising:
performing handoff to the cell based on a first handoff scheme if the cell is in synchronous operation; and
performing handoff to the cell based on a second handoff scheme if the cell is in asynchronous operation.

25. The method of claim 20, further comprising:
detecting decreasing transmit power for the cell prior to a switch from asynchronous operation to synchronous operation by the cell; and
detecting increasing transmit power for the cell after the switch from asynchronous operation to synchronous operation by the cell.

26. An apparatus for wireless communication, comprising:
at least one processor configured to receive a mode indicator indicating synchronous operation or asynchronous operation by a cell, to receive a cell identity (ID) of the cell for the cell, the cell ID omitting the mode indicator, to use the cell ID for communication with the cell, and to perform cell searches based on whether the mode indicator indicates synchronous operation or asynchronous operation by the cell.

27. The apparatus of claim 26, wherein the at least one processor is configured to generate a scrambling sequence or a frequency hopping sequence based on the cell ID, and to process data to send to the cell with the scrambling sequence or the frequency hopping sequence.

28. The apparatus of claim 26, wherein the at least one processor is configured to receive system time information from the cell prior to a switch from asynchronous operation to synchronous operation by the cell, to determine updated system time for the cell based on the system time information, and to use the updated system time for communication with the cell after the switch to synchronous operation by the cell.

29. The apparatus of claim 26, wherein the at least one processor is configured to detect decreasing transmit power for the cell prior to a switch from asynchronous operation to synchronous operation by the cell, and to detect increasing transmit power for the cell after the switch from asynchronous operation to synchronous operation by the cell.

* * * * *